(12) United States Patent
Kikuchi et al.

(10) Patent No.: US 9,239,770 B2
(45) Date of Patent: Jan. 19, 2016

(54) APPARATUS AND METHOD FOR EXTRACTING RESTRICTION CONDITION

(71) Applicant: FUJITSU LIMITED, Kawasaki-shi, Kanagawa (JP)

(72) Inventors: Shinji Kikuchi, Yokohama (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 13/973,086

(22) Filed: Aug. 22, 2013

(65) Prior Publication Data
US 2014/0149989 A1    May 29, 2014

(30) Foreign Application Priority Data

Nov. 29, 2012 (JP) ................................ 2012-261586

(51) Int. Cl.
| | |
|---|---|
| G06F 9/46 | (2006.01) |
| G06F 7/38 | (2006.01) |
| G06F 11/30 | (2006.01) |
| G06F 9/445 | (2006.01) |

(52) U.S. Cl.
CPC . *G06F 11/30* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 8,615,768 | B2 * | 12/2013 | Kwan et al. | 718/106 |
| 8,898,676 | B2 * | 11/2014 | Hiltgen et al. | 718/106 |
| 2005/0203967 | A1 | 9/2005 | Matsui | |
| 2006/0031460 | A1 | 2/2006 | Araki et al. | |
| 2006/0136490 | A1 * | 6/2006 | Aggarwal et al. | 707/103 R |

(Continued)

FOREIGN PATENT DOCUMENTS

| | | |
|---|---|---|
| JP | 2004-185607 | 7/2004 |
| JP | 2005-285101 | 10/2005 |
| JP | 4399740 B2 | 1/2010 |

(Continued)

OTHER PUBLICATIONS

Axel van Lamsweerde, et al., "Inferring Declarative Requirements Specifications from Operational Scenarios", IEEE Transactions on Software Engineering, vol. 24, No. 12, Dec. 1998, pp. 1089-1114.

(Continued)

*Primary Examiner* — Meng An
*Assistant Examiner* — Bing Zhao
(74) *Attorney, Agent, or Firm* — Fujitsu Patent Center

(57) ABSTRACT

A restriction condition extraction apparatus specifies operation targets including a first target and another target related thereto that are operated based on first procedure information in a first execution environment, extracts first procedures related to the specified operation targets from the first procedure information, generates first relation information indicating an execution order on related operation targets regarding the extracted first procedures, specifies operation targets including a second target and another target related thereto that are operated based on second procedure information in a second execution environment, extracts second procedures related to the specified operation targets from the second procedure information, generates second relation information indicating an execution order on related operation targets regarding the extracted second procedures, compares the first and the second relation information, and extracts relations of an execution order on related operation targets, which are common in the first and the second relation information.

4 Claims, 19 Drawing Sheets

(56) References Cited

U.S. PATENT DOCUMENTS

2011/0066889 A1    3/2011   Kikuchi
2012/0137209 A1    5/2012   Saito

FOREIGN PATENT DOCUMENTS

JP    2012-113640    6/2012
WO    2009144826    12/2009

OTHER PUBLICATIONS

Weverton Luis da Costa Cordeiro et al.,"CHANGEMINER: A Solution for Discovering IT Change Templates from Past Execution Traces", IFIP/IEEE International Symposium on Integrated Network Management (IM '09), 2009, pp. 97-104.

* cited by examiner

FIG.2

```
                        21
FIRST LINE  → stop_monitor(MS)      // STOP MONITORING
SECOND LINE → foreach ( s in List2.txt){

THIRD LINE  →    install(s, application)
                 if (install_success) {
FIFTH LINE  →       reboot(s)}       // REBOOT s
SIXTH LINE  →    else { restore(s)}  // RESTORE STATE OF s
                 }
EIGHTH LINE → start_monitor(MS)      // RESTART MONITORING
```

FIG.3

```
            22
List2.txt
  Server S4
  Server S5
  Server S6
```

IN GRAPH FORM

IN TABLE FORM

| Source | Destination | Relation |
|--------|-------------|----------|
| MS | S4 | monitor |
| MS | S5 | monitor |
| MS | S6 | monitor |
| S6 | C1 | communicate |

FIG.6B

| | RESTRICTION CANDIDATE k1<br>RELATION REGARDING ONLY MS | RESTRICTION CANDIDATE k2<br>RELATION REGARDING ONLY S1, S2, AND S3 | RESTRICTION CANDIDATE k3<br>RELATION BETWEEN MS AND S1, S2, AND S3 |
|---|---|---|---|
| RESTRICTION CANDIDATE FOR PREPROCESSING | Do stop_monitor(MS) before start_monitor(MS)<br><br>Do start_monitor(MS) before stop_monitor(MS)<br><br>RESTRICTION CANDIDATE k4 | Do apply_patch(S1, Patch) before reboot(S1)<br><br>Do reboot(S1) before apply_patch(S1, Patch)<br><br>(THERE IS ALSO SIMILAR RESTRICTION CANDIDATE REGARDING S2 AND S3)<br>RESTRICTION CANDIDATE k5 | Do stop_monitor(MS) before apply_patch(S1, Patch)<br><br>Do stop_monitor(MS)before reboot(S1)<br><br>Do start_monitor(MS)before apply_patch(S1, Patch)<br><br>Do start_monitor(MS)before reboot(S1)<br><br>(THERE IS ALSO RESTRICTION CANDIDATE IN WHICH OPERATIONS BEFORE AND AFTER "BEFORE" ARE OPPOSITE)<br>(THERE IS ALSO SIMILAR RESTRICTION CANDIDATE REGARDING S2 AND S3) |
| RESTRICTION CANDIDATE FOR POST-PROCESSING | Do stop_monitor(MS) after start_monitor(MS)<br><br>Do start_monitor(MS) after stop_monitor(MS) | Do apply_patch(S1, Patch) after reboot(S1)<br><br>Do reboot(S1) after apply_patch(S1, Patch)<br><br>(THERE IS ALSO SIMILAR RESTRICTION CANDIDATE REGARDING S2 AND S3) | Do stop_monitor(MS) after apply_patch(S1, Patch)<br>RESTRICTION CANDIDATE k6<br><br>Do stop_monitor(MS)after reboot(S1)<br><br>Do start_monitor(MS)after apply_patch(S1, Patch)<br><br>Do start_monitor(MS)after reboot(S1)<br><br>(THERE IS ALSO RESTRICTION CANDIDATE IN WHICH OPERATIONS BEFORE AND AFTER "AFTER" ARE OPPOSITE)<br>(THERE IS ALSO SIMILAR RESTRICTION CANDIDATE REGARDING S2 AND S3) |

FIG.8B

VERIFICATION RESULT OF RESTRICTION CANDIDATE FOR PREPROCESSING(Do Y Before X)

| ↓Y  X→ | stop_monitor(MS) | start_monitor(MS) | apply_patch(s, Patch) | reboot(s) |
|---|---|---|---|---|
| stop_monitor(MS) | - | Allowed | Allowed | Allowed |
| start_monitor(MS) | Denied | - | Denied | Denied |
| apply_patch(s, Patch) | Denied | Allowed | - | Allowed |
| reboot(s) | Denied | Denied | Denied | - |

VERIFICATION RESULT OF RESTRICTION CANDIDATE FOR POST-PROCESSING(Do Y After X)

| ↓Y  X→ | stop_monitor(MS) | start_monitor(MS) | apply_patch(s, Patch) | reboot(s) |
|---|---|---|---|---|
| stop_monitor(MS) | - | Denied | Denied | Denied |
| start_monitor(MS) | Allowed | - | Allowed | Allowed |
| apply_patch(s, Patch) | Denied | Denied | - | Denied |
| reboot(s) | Denied | Denied | Denied | - |

FIG.10

OPERATION CONTROL INFORMATION 21 OF APPLICATION
INSTALLATION OPERATION (OPERATION B)

```
stop_monitor(MS)    // STOP MONITORING
foreach ( s in List2.txt){ install(s, application)
if (install_success) {
    reboot(s)}      // REBOOT s
    else { restore(s)}  // RESTORE STATE OF s
}
start_monitor(MS)   // RESTART MONITORING
```

ANALYSIS TARGET
DEVICE
S4
S5
S6
MS

OPERATION RELATED
TO ANALYSIS
TARGET DEVICE

REGARDING MS
stop_monitor
start_monitor

REGARDING
S4, S5, AND S6
install
reboot
restore

FIG.12

VERIFICATION RESULT OF RESTRICTION CANDIDATE FOR PREPROCESSING(Do Y Before X)

| ↓Y  X→ | stop_monitor(MS) | start_monitor(MS) | Install(s) | reboot(s) | restore(s) |
|---|---|---|---|---|---|
| stop_monitor(MS) | – | Allowed | Allowed | Allowed | Allowed |
| start_monitor(MS) | Denied | – | Denied | Denied | Denied |
| Install(s) | Denied | Allowed | – | Allowed | Allowed |
| reboot(s) | Denied | Denied | Denied | – | Denied |
| restore(s) | Denied | Denied | Denied | Denied | – |

VERIFICATION RESULT OF RESTRICTION CANDIDATE FOR POST-PROCESSING(Do Y After X)

| ↓Y  X→ | stop_monitor(MS) | start_monitor(MS) | Install(s) | reboot(s) | restore(s) |
|---|---|---|---|---|---|
| stop_monitor(MS) | – | Denied | Denied | Denied | Denied |
| start_monitor(MS) | Allowed | – | Allowed | Allowed | Allowed |
| Install(s) | Denied | Denied | – | Denied | Denied |
| reboot(s) | Denied | Denied | Denied | – | Denied |
| restore(s) | Denied | Denied | Denied | Denied | – |

FIG.13A

RESTRICTION CANDIDATE FOR PREPROCESSING REGARDING OPERATION A (Do Y Before X)

| ↓Y  X→ | stop_monitor(MS) | start_monitor(MS) | apply_patch(s, Patch) | reboot(s) |
|---|---|---|---|---|
| stop_monitor(MS) | - | (Allowed) | Allowed | (Allowed) |
| start_monitor(MS) | Denied | - | Denied | Denied |
| apply_patch(s, Patch) | Denied | Allowed | - | Allowed |
| reboot(s) | Denied | Denied | Denied | - |

↔

RESTRICTION CANDIDATE FOR PREPROCESSING REGARDING OPERATION B (Do Y Before X)

| ↓Y  X→ | stop_monitor(MS) | start_monitor(MS) | Install(s) | reboot(s) | restore(s) |
|---|---|---|---|---|---|
| stop_monitor(MS) | - | (Allowed) | Allowed | (Allowed) | Allowed |
| start_monitor(MS) | Denied | - | Denied | Denied | Denied |
| Install(s) | Denied | Allowed | - | Allowed | Allowed |
| reboot(s) | Denied | Denied | Denied | - | Denied |
| restore(s) | Denied | Denied | Denied | Denied | - |

→

EXTRACTED RESTRICTION CONDITION FOR PREPROCESSING:
(1) Do stop_monitor(MS) before start_monitor(MS) (if MS monitors s)
(2) Do stop_monitor(MS) before reboot(s) (if MS monitors s)

FIG. 13B

RESTRICTION CANDIDATE FOR POST-PROCESSING REGARDING OPERATION A (Do Y After X)

| ↓Y  X→ | stop_monitor(MS) | start_monitor(MS) | apply_patch(s, Patch) | reboot(s) |
|---|---|---|---|---|
| stop_monitor(MS) | – | Denied | Denied | Denied |
| start_monitor(MS) | (Allowed) | – | Allowed | (Allowed) |
| apply_patch(s, Patch) | Denied | Denied | – | Denied |
| reboot(s) | Denied | Denied | Denied | – |

↔

RESTRICTION CANDIDATE FOR POST-PROCESSING REGARDING OPERATION B (Do Y After X)

| ↓Y  X→ | stop_monitor(MS) | start_monitor(MS) | Install(s) | reboot(s) | restore(s) |
|---|---|---|---|---|---|
| stop_monitor(MS) | – | Denied | Denied | Denied | Denied |
| start_monitor(MS) | (Allowed) | – | Allowed | (Allowed) | Allowed |
| Install(s) | Denied | Allowed | – | Denied | Denied |
| reboot(s) | Denied | Denied | Denied | – | Denied |
| restore(s) | Denied | Denied | Denied | Denied | – |

→

EXTRACTED RESTRICTION CONDITION FOR POST-PROCESSING:
(1) Do start_monitor(MS) after stop_monitor(MS)
(2) Do start_monitor(MS) after reboot(s) (if MS monitors s)

FIG.14

| o1 | o2 | o3 | o4 |
|---|---|---|---|
| RELATION BETWEEN n AND m | OPERATION | RELATION BETWEEN OPERATIONS | OPERATION |
| – (NONE) | stop_monitor(n) | before | start_monitor(n) |
| – (NONE) | start_monitor(n) | after | stop_monitor(n) |
| monitor | stop_monitor(n) | before | reboot(m) |
| monitor | start_monitor(n) | after | reboot(m) |

APPARATUS AND METHOD FOR EXTRACTING RESTRICTION CONDITION

CROSS-REFERENCE TO RELATED APPLICATION

This application is based upon and claims the benefit of priority of the prior Japanese Patent Application No. 2012-261586, filed on Nov. 29, 2012, the entire contents of which are incorporated herein by reference.

FIELD

The embodiment discussed herein is related to a restriction condition extraction program, a restriction condition extraction apparatus, and a restriction condition extraction method.

BACKGROUND

There is used a cloud system that enables the use of a plurality of computing resources on a network as computing resources of a user by a technique of virtualizing a server and a network. Such a cloud system is expanding its scale and is becoming more complicated every year.

With this, manual operations and visual confirmation performed as operation management work are reaching limits of operators, and some of the operation management work has been automated. For example, a management server managing a cloud system applies, with use of a script, automatically a patch operation to servers under the cloud system. Thus, reliability and validity are essential to scripts used for automating operation management work such as patch operations.

Then, a verification system verifies whether a script to be executed satisfies certain conditions (restriction conditions) before the script is executed. The restriction condition is determined by a manager in a top-down manner. A conventional example is described in Japanese Laid-open Patent Publication No. 2005-285101.

However, it becomes difficult for the manager to construct accurately restriction conditions used for script verification. That is, the manager does not necessarily understand all restriction conditions to be fulfilled. For example, the manager does not understand sufficiently a configuration of a larger-scale cloud system or changes in devices forming a larger-scale cloud system. Consequently, the manager can fail to sufficiently understand all restriction conditions to be fulfilled. This makes it difficult for the manager to construct accurate restriction conditions.

SUMMARY

According to an aspect of an embodiment, a non-transitory computer-readable recording medium stores a restriction condition extraction program. The restriction condition extraction program causes a computer to execute a process.

The process includes first specifying operation targets including a first target and another target related to the first target that are operated based on first procedure information containing a plurality of procedures, in a first execution environment. The process includes extracting first procedures related to the operation targets specified at the first specifying from the first procedure information. The process includes generating first relation information indicating relations of an execution order on related operation targets regarding the extracted first procedures. The process includes second specifying operation targets including a second target and another target related to the second target that are operated based on second procedure information containing a plurality of procedures, in a second execution environment that is different from the first execution environment. The process includes extracting second procedures related to the operation targets specified at the second specifying from the second procedure information. The process includes generating second relation information indicating relations of an execution order on related operation targets regarding the extracted second procedures. The process includes extracting relations of an execution order on related operation targets, the relations being common in the first relation information and the second relation information, based on comparison between the first relation information and the second relation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an example diagram of operation control information;

FIG. 3 is an example diagram of an operation target list;

FIG. 8B is diagram (2) explaining an example of processing by the restriction candidate sufficiency verifying unit;

FIG. 10 is a diagram explaining another example of processing by the restriction candidate extracting unit;

FIG. 12 is a diagram explaining another example of processing by the restriction candidate sufficiency verifying unit;

FIG. 13A is diagram (1) explaining an example of processing by a restriction condition comparing unit;

FIG. 13B is diagram (2) explaining an example of processing by the restriction condition comparing unit;

FIG. 14 is a diagram of an output example of restriction conditions;

DESCRIPTION OF EMBODIMENT

Preferred embodiments of the present invention will be explained with reference to accompanying drawings. The embodiment does not limit the invention.

Configuration of Restriction Condition Extraction Apparatus

Figure 1:
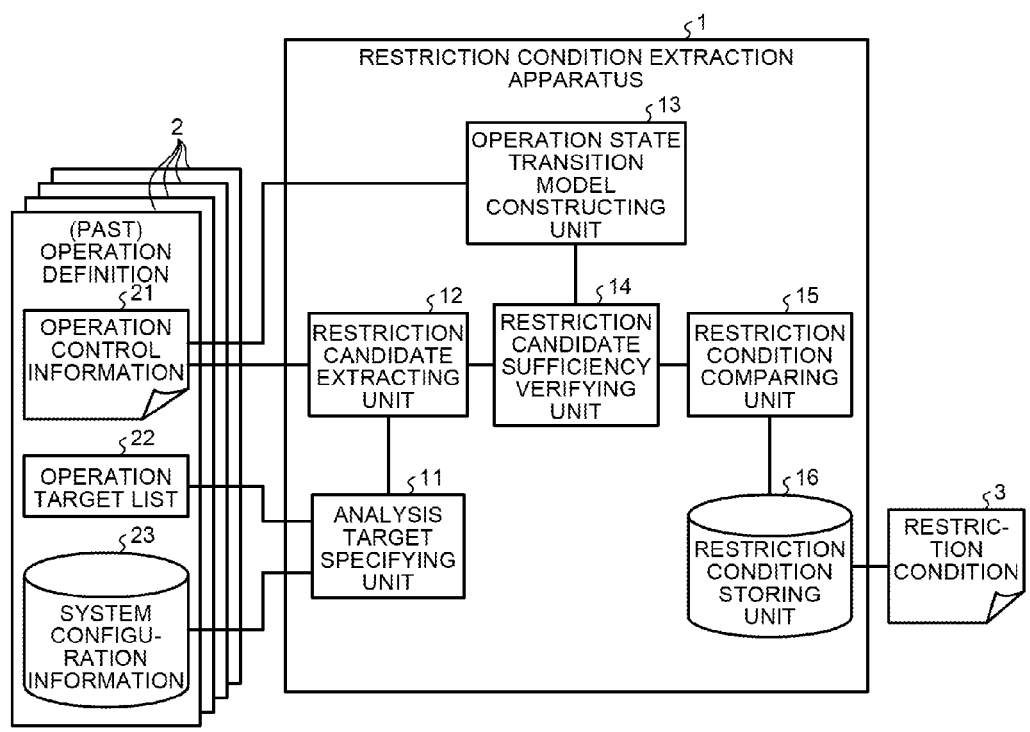
FIG. 1 is a functional block diagram of a configuration of a restriction condition extraction apparatus of an embodiment.

FIG. 1 is a functional block diagram of a configuration of a restriction condition extraction apparatus of the embodiment. A restriction condition extraction apparatus 1 extracts restriction conditions to be fulfilled in an accurate operation management process. The restriction conditions are used for evaluating the accuracy of an operation management process employed in the operation management of a cloud system, for example. The operation management process indicates various procedure manuals and scripts used in the operation management on a cloud system, for example. In the embodiment, the restriction condition extraction apparatus 1 receives a plurality of past operation management processes, and focuses on the relation between components represented by a system configuration when each of the received operation management processes is performed. Then, the restriction condition extraction apparatus 1 extracts relations, regarding an execution order of operations on components having a certain relation established, which are common in a plurality of operation management processes, and outputs the extracted relations as restriction conditions.

As illustrated in FIG. 1, the restriction condition extraction apparatus 1 receives past operation definitions 2, and outputs restriction conditions 3. The operation definition 2 includes operation control information 21, an operation target list 22, and system configuration information 23 as a set. The operation control information 21 is an operation management process, and defines operation processing performed on an operation target. For example, the operation control information 21 describes therein operation processing in a program form or a script form.

The operation target list 22 is a list representing a set of operation targets. The system configuration information 23 is information of system configuration in the operation, and defines relations established between system components. The system configuration information 23 can be defined in a graph form or a table form. The operation targets and components are physical machines such as servers, for example. However, they may be virtual machines. In the embodiment, the operation targets and components are explained as servers. The operation definition 2 may be stored in an external storage device of the restriction condition extraction apparatus 1 or in a storage device of an apparatus connected to a network.

Figures 4A, 4B:
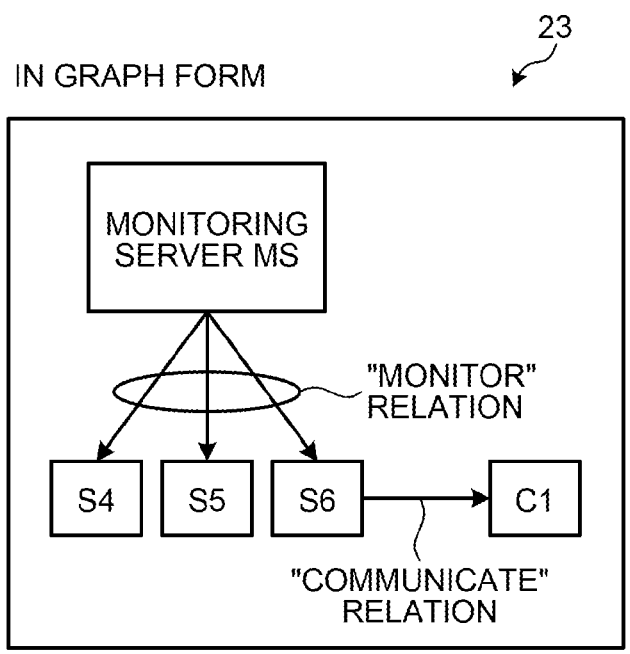
FIG. 4A is diagram (1) illustrating an example of system configuration information.
FIG. 4B is diagram (2) illustrating an example of system configuration information.

The following describes an example of a set of operation definition 2 with reference to FIGS. 2 to 4B. FIG. 2 is an example diagram of the operation control information. FIG. 3 is an example diagram of the operation target list. FIG. 4A is an example diagram of the system configuration information in a graph form. FIG. 4B is an example diagram of the system configuration information in a table form;

As illustrated in FIG. 2, the operation control information 21 is a script for the operation control related to the application installation application. The "MS" illustrated in FIG. 2 indicates a monitoring server that monitors servers that are operation targets. The first line of the script describes stop operation of the monitoring server represented as "MS" (stop_monitor). The third line of the script describes installation operation (install) of operation targets in the operation target list 22 represented as "List2.txt" in the second line. The fifth line of the script describes reboot operation (reboot) of the operation targets for a case in which the installation of the operation targets succeeds. The sixth line of the script describes restoration operation (restore) of the states of the operation targets for a case in which the installation of the operation targets fails.

As illustrated in FIG. 3, the operation target list 22 describes "Server S4", "Server S5", and "Server S6" as operation target devices in "List2.txt". The "Server" indicates a server that is an operation target device. For example, the "List2.txt" is read in the second line of the script in FIG. 2. Then, the operation target devices obtained as a result of reading the "List2.txt" is read are installed in the third line of the script in FIG. 2

As illustrated in FIG. 4A, the system configuration information represents the relation in which the monitoring server MS monitors servers S4, S5, and S6(monitor) and the relation in which the server S6 and a server C1 are connected (communicate), and is defined in a graph form. FIG. 4B defines the system configuration information illustrated in FIG. 4A in a table form.

Returning to FIG. 1, the restriction condition extraction apparatus 1 includes an analysis target specifying unit 11, a restriction candidate extracting unit 12, an operation state transition model constructing unit 13, a restriction candidate sufficiency verifying unit 14, a restriction condition comparing unit 15, and a restriction condition storing unit 16.

The analysis target specifying unit 11 specifies analysis targets in the operation of a system to which the operation control information 21 is applied. For example, the operation target list 22 and the system configuration information 23 that are in the same set as the operation control information 21 are input to the analysis target specifying unit 11 based on the operation definition 2. Then, the analysis target specifying unit 11 specifies operation targets devices included in the received operation target list 22 as analysis target devices. Moreover, the analysis target specifying unit 11 specifies devices related to the specified operation target devices as analysis target devices based on the received system configuration information 23.

The restriction candidate extracting unit 12 extracts, regarding the operation control information 21, restriction candidates that can be restrictions (hereinafter, referred to as restriction candidates) for each of given restriction types. In the embodiment, the restriction types include the following preprocessing and post-processing. The preprocessing is processing in which the operation Y is always performed before the operation X. Such preprocessing is appropriately described as "Do Y before X" in the following. The post-processing is processing in which the operation Y is always performed after the operation X. Such post-processing is appropriately described as "Do Y after X" in the following. The X and Y in the preprocessing and post-processing indicate parameters representing operations performed on devices. That is, the preprocessing and post-processing as restriction types are processing indicating the execution order of operations on devices. The restriction candidates are extracted for each of a plurality of pieces of operation control information 21.

For example, the restriction candidate extracting unit 12 extracts, from the operation control information 21, operations that can be correspond to X and Y in the preprocessing and post-processing as restriction types. To be more specific, the restriction candidate extracting unit 12 extracts operations related to the analysis target devices specified by the analysis target specifying unit 11 from the operation control information 21. Then, the restriction candidate extracting unit 12 extracts, using the preprocessing with parameterized operation parts and the operations related to the analysis target devices, restriction candidates for the preprocessing considering the system configurations of the analysis target devices. Similarly, the restriction candidate extracting unit 12 extracts, using the post-processing with parameterized operation parts and the operations related to the analysis target devices, restriction candidates for the post-processing considering the system configurations of the analysis target devices. The restriction candidate extracting unit 12 extracts restriction candidates for the preprocessing and post-processing without considering an actual operation execution order described in the operation control information 21.

The operation state transition model constructing unit 13 converts an operation string of the operation control information 21 into description for a model verification tool, and constructs a state transition model regarding operations. Each state in the state transition model is an execution state of an operation related to the analysis target device specified by the analysis target specifying unit 11.

The restriction candidate sufficiency verifying unit 14 verifies the sufficiency of each restriction candidate regarding the operation control information 21 with use of the state transition model constructed based on the operation control information 21. For example, the restriction candidate sufficiency verifying unit 14 detects a verification result indicating that the sufficiency is fulfilled or a verification result indicating that the sufficiency is not fulfilled for each extracted restriction candidate. Then, the restriction candidate sufficiency verifying unit 14 generates restriction candidate information including the verification result for each extracted restriction candidate. To be more specific, the restriction candidate sufficiency verifying unit 14 generates, for one operation definition 2, restriction candidate information for the preprocessing and restriction candidate information for the post-processing.

The restriction condition comparing unit 15 compares a plurality of pieces of restriction candidate information generated based on a plurality of operation definitions 2, and extracts restriction candidates Existent in the plurality of operation definitions 2 as restriction conditions. That is, the restriction condition comparing unit 15 compares a plurality of pieces of restriction candidate information, and extracts restriction candidates of related devices or a single device, which are common in the plurality of pieces of restriction candidate information, as restriction conditions. For example, the restriction condition comparing unit 15 compares restriction candidate information regarding the preprocessing between two operation definitions 2. Then, the restriction condition comparing unit 15 extracts restriction candidates existent in the two operation definitions 2 as restriction conditions. Similarly, the restriction condition comparing unit 15 compares restriction candidate information regarding the post-processing between two operation definitions 2. Then, the restriction condition comparing unit 15 extracts restriction candidates existent in the two operation definitions 2 as restriction conditions. Moreover, the restriction condition comparing unit 15 stores the extracted restriction conditions in the restriction condition storing unit 16 described later.

It is assumed, as an example, that a restriction candidate fulfilling the sufficiency for the preprocessing in one operation definition 2 is "Do stop_monitor (MS) before start_monitor (MS)" and a restriction candidate fulfilling the sufficiency for the preprocessing in the other operation definition 2 is "Do stop_monitor (MS) before start_monitor (MS)". In this case, both restriction candidates are matched, and thus the restriction condition comparing unit 15 extracts the matched restriction candidate as a restriction condition.

The restriction condition storing unit 16 stores restriction conditions stored by the restriction condition comparing unit 15.

Next, an example of processing of generating restriction candidate information for the preprocessing and restriction candidate information for the post-processing based on one operation definition 2 will be explained with reference to FIGS. 5 to 8B.

Example of Processing by Analysis Target Specifying Unit

Figure 5:
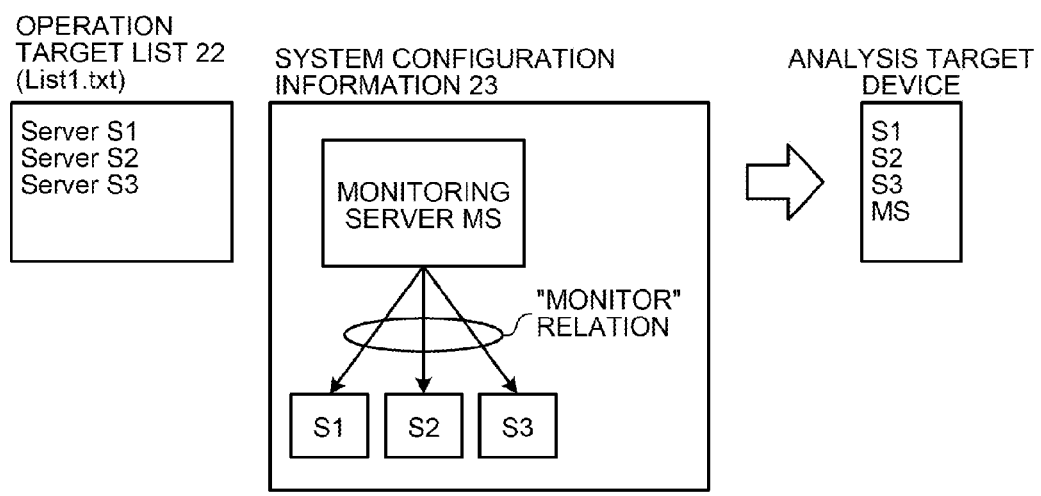
FIG. 5 is a diagram explaining an example of processing by an analysis target specifying unit.
Figure 6:
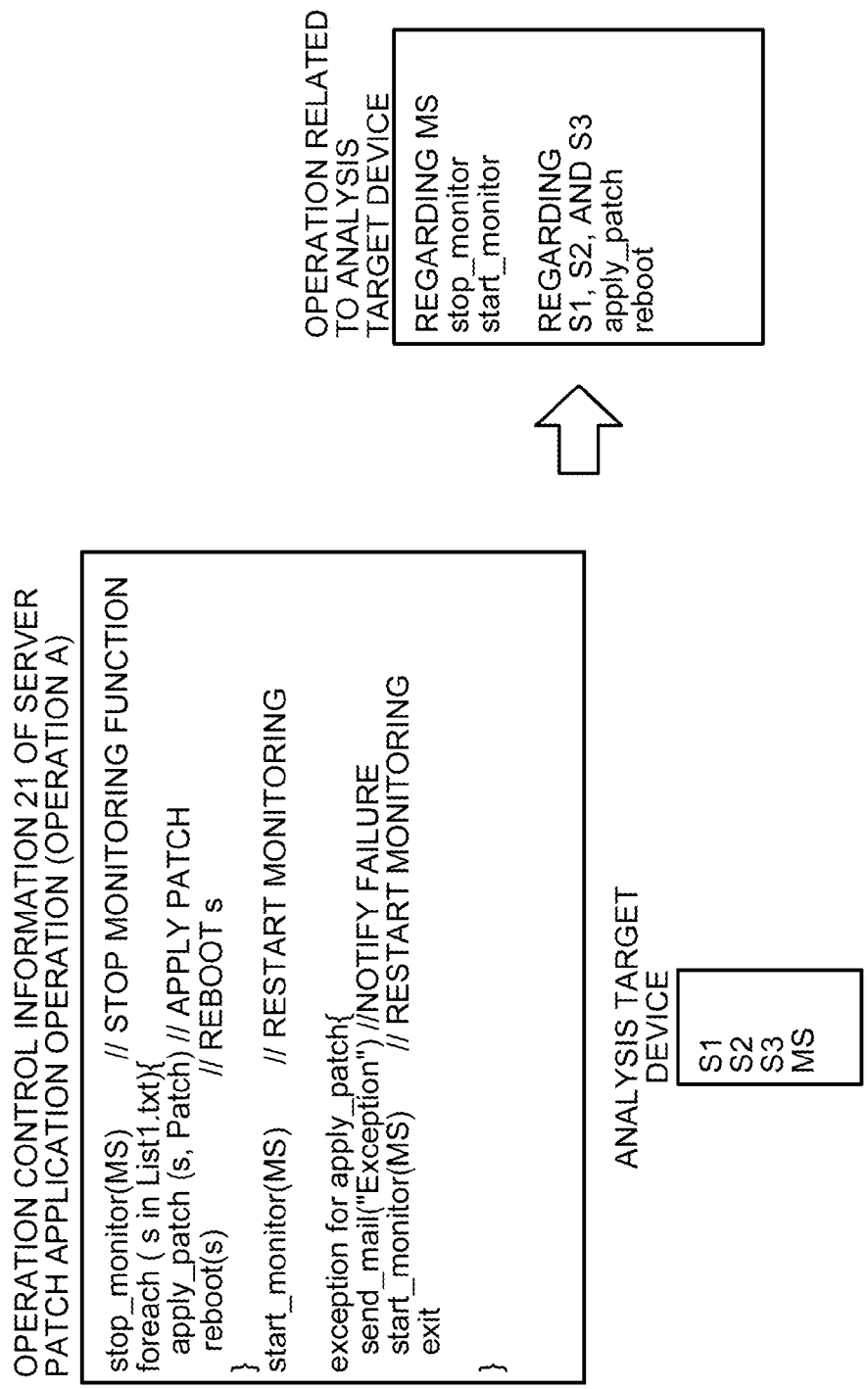
FIG. 6A is diagram (1) explaining an example of processing by a restriction candidate extracting unit.
FIG. 6B is diagram (2) explaining an example of processing by the restriction candidate extracting unit.

First, an example of processing by the analysis target specifying unit 11 is described with reference to FIG. 5. FIG. 5 is a diagram explaining an example of processing by the analysis target specifying unit. As illustrated in FIG. 5, the operation target list 22 (List1.txt) of the operation definition 2 describes therein "Server S1" indicating a server S1, "Server S2" indicating a server S2, and "Server S3" indicating a server S3 as operation target devices. The system configuration information 23 of the operation definition 2 defines the relation in which the monitoring server MS monitors the servers S1, S2, and S3 (monitor) as system configuration information.

The analysis target specifying unit 11 specifies the servers S1, S2, and S3 as analysis target devices based on the operation target list 22. The analysis target specifying unit 11 also specifies the monitoring server MS that is a device related to the servers S1, S2, and S3 that are the specified operation target devices, as an analysis target device, based on the system configuration information 23. That is, the analysis target specifying unit 11 specifies the servers S1, S2, and S3, and the server MS as analysis target devices.

Example of Processing by Restriction Candidate Extracting Unit

Next, an example of processing by the restriction candidate extracting unit 12 is described with reference to FIGS. 6A and 6B. FIGS. 6A and 6B are diagrams explaining an example of processing by the restriction candidate extracting unit.

As illustrated in FIG. 6A, the operation control information 21 is a script for the operation control related to server patch application operation. The analysis target devices are the servers S1, S2, and S3, and the monitoring server MS specified by the analysis target specifying unit 11. It is assumed that the preprocessing as one of restriction types is "Do Y before X" indicating that the operation Y is always performed before the operation X. It is also assumed that the post-processing as one of restriction types is "Do Y after X" indicating that the operation Y is always performed after the operation X. The X and Y in the preprocessing and post-processing are parameters representing operations performed on devices.

The restriction candidate extracting unit 12 extracts operations related to the analysis target devices from the operation control information 21. That is, the restriction candidate extracting unit 12 extracts operations that can be included in X and Y in the preprocessing and post-processing in accordance with the analysis target devices. Regarding the monitoring server MS, the restriction candidate extracting unit 12 extracts "stop_monitor" indicating the operation for stopping a monitoring function and "start_monitor" indicating the operation for restarting the monitoring function. Regarding the servers S1, S2, and S3, the restriction candidate extracting unit 12 extracts "apply_patch" indicating the operation for applying a patch and "reboot" indicating the rebooting operation.

As illustrated in FIG. 6B, the restriction candidate extracting unit 12 extracts, using the preprocessing "Do Y before X" with parameterized operation parts and the operations related to the analysis target devices, restriction candidates for the preprocessing considering system configurations of the analysis target devices. Regarding only the monitoring server MS, "Do stop_monitor (MS) before start_monitor (MS)" is extracted as one restriction candidate k1, for example. Regarding only the server S1, "Do apply_patch (S1, Patch) before reboot (S1)" is extracted as one restriction candidate k2, for example. Regarding both the monitoring server MS and the server S1, "Do stop_monitor (MS) before apply_patch (S1, Patch)" is extracted as one restriction candidate k3, for example. The restriction candidate extracting unit 12 does not consider an execution order of operations, and thus extracts restriction candidates in which the operations of X and Y are made opposite. Furthermore, the restriction candidate extracting unit 12 extracts restriction candidates for the preprocessing regarding only the server S2, only the server S3, both the monitoring server MS and the server S2, and both the monitoring server MS and the server S3.

Then, the restriction candidate extracting unit 12 extracts, using the post-processing "Do Y after X" with parameterized operation parts and the operations related to the analysis target devices, restriction candidates for the post-processing considering system configurations of the analysis target devices. Regarding only the monitoring server MS, "Do stop_monitor (MS) after start_monitor (MS)" is extracted as one restriction candidate k4, for example. Regarding only the server S1, "Do apply_patch (S1, Patch) after reboot (S1)" is extracted as one restriction candidate k5, for example. Regarding both the monitoring server MS and the server S1, "Do stop_monitor (MS) after apply_patch (S1, Patch)" is extracted as one restriction candidate k6, for example. The restriction candidate extracting unit 12 does not consider an execution order of operations, and thus extracts restriction candidates in which the operations of X and Y are made opposite. Furthermore, the restriction candidate extracting unit 12 extracts restriction candidates for the post-processing regarding only the server S2, only the server S3, both the monitoring server MS and the server S2, and both the monitoring server MS and the server S3.

Example of Processing by Operation State Transition Model Constructing Unit

Figure 7:
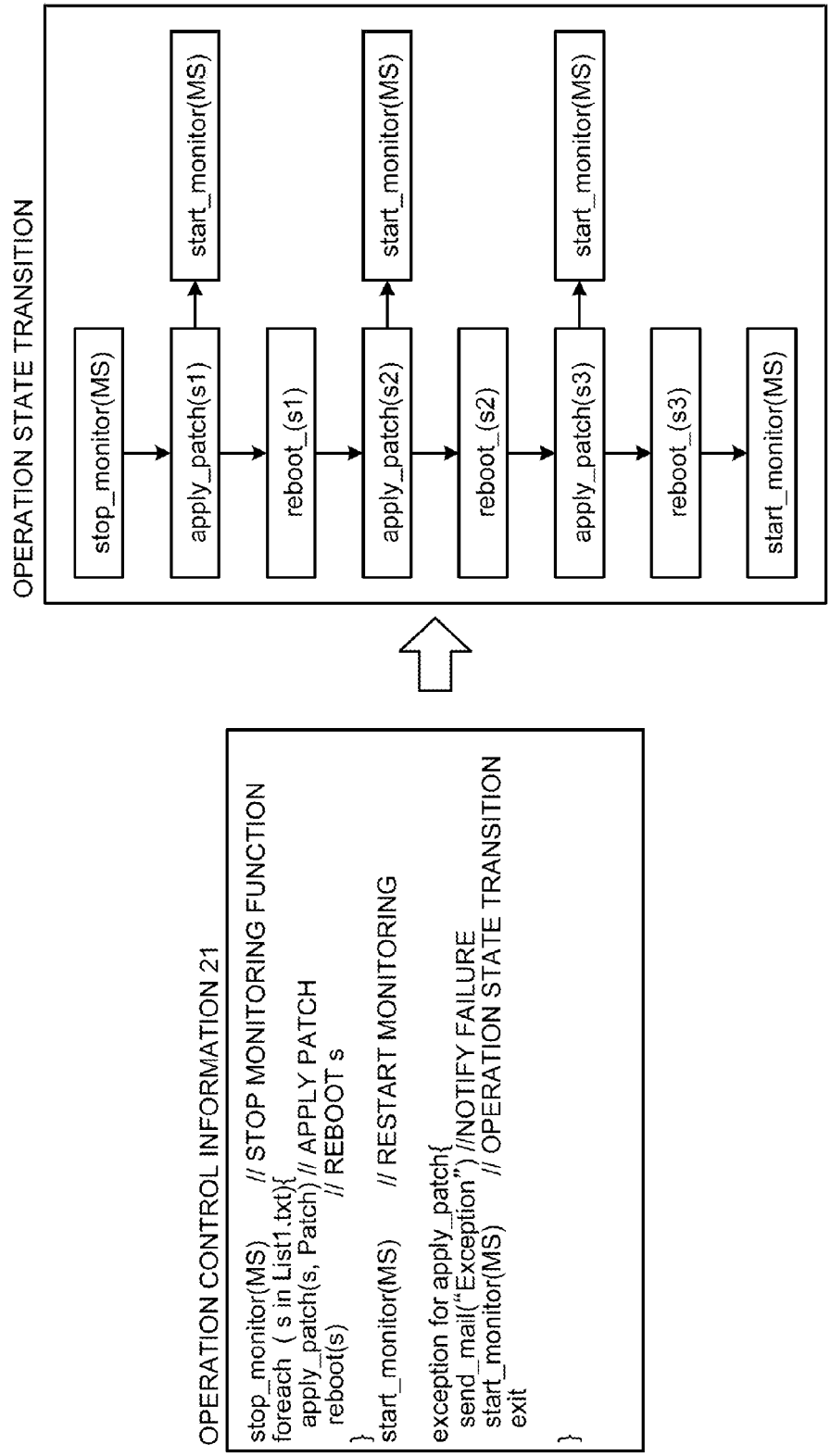
FIG. 7 is a diagram explaining an example of processing by an operation state transition model constructing unit.

Next, an example of processing by the operation state transition model constructing unit 13 is described with reference to FIG. 7. FIG. 7 is a diagram explaining an example of processing by the operation state transition model constructing unit. As illustrated in FIG. 7, the operation state transition is constructed based on the operation control information 21. That is, the operation state transition model constructing unit 13 constructs a state transition model related to operations based on an operation string of the operation control information 21. Each state in the operation state transition model corresponds to an execution state of an operation related to the analysis target device. The operation state transition constructed based on the operation control information 21 describes therein that "stop_monitor" is executed on the monitoring server MS, for example. In addition, the operation state transition describes therein that "apply_patch" is executed on the server s1 after "stop_monitor" is executed, and "reboot" is executed on the server s1 when the application of a patch succeeds, or "start_monitor" is executed on the monitoring server MS when the application of a patch fails. The operation state transition constructed by the operation state transition model constructing unit 13 is used by the restriction candidate sufficiency verifying unit 14 for restriction candidate sufficiency verification.

Example of Processing by Restriction Candidate Sufficiency Verifying Unit

Figure 8A:
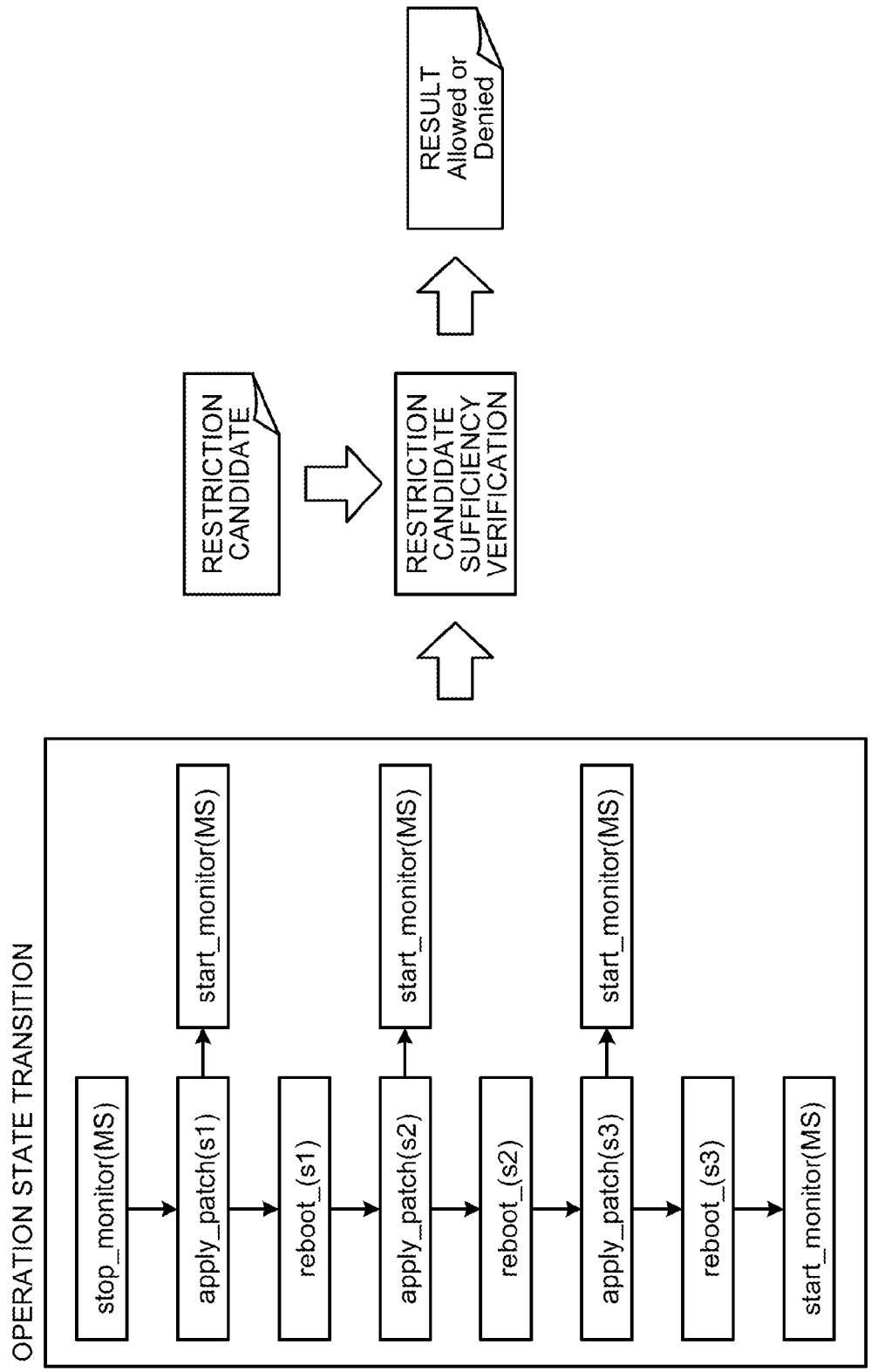
FIG. 8A is diagram (1) explaining an example of processing by a restriction candidate sufficiency verifying unit.

Next, an example of processing by the restriction candidate sufficiency verifying unit 14 is described with reference to FIGS. 8A and 8B. FIGS. 8A and 8B are diagrams explaining an example of processing by the restriction candidate sufficiency verifying unit.

As illustrated in FIG. 8A, the restriction candidate sufficiency verifying unit 14 performs restriction candidate sufficiency verification of restriction candidates extracted by the restriction candidate extracting unit 12 using the operation state transition constructed by the operation state transition model constructing unit 13, and detects a verification result for each restriction candidate. The verification result is represented with "Allowed" when a restriction candidate fulfills the sufficiency, and with "Denied" when a restriction candidate does not fulfill the sufficiency. Then, the restriction candidate sufficiency verifying unit 14 generates restriction candidate information including the verification result for each restriction candidate.

The upper table of the FIG. 8B represents restriction candidate information including the verification results of restriction candidates for the preprocessing. The verification result is "Allowed" regarding the restriction candidate "Do stop_monitor (MS) Before start_monitor (MS)", that is, the restriction candidate in which the operation "stop_monitor (MS)" is always performed before the operation "start_monitor (MS)", for example. As another example, the verification result is "Allowed" regarding the restriction candidate "Do stop_monitor (MS) Before apply_patch (s, Patch)", that is, the restriction candidate in which the operation "stop_monitor (MS)" is always performed before the operation "apply_patch (s, Patch)". By contrast, the verification result is "Denied" regarding the restriction candidate "Do start_monitor (MS) Before stop_monitor (MS)", that is, the restriction candidate in which the operation "start_monitor (MS)" is always performed before the operation "stop_monitor (MS)".

The lower table of the FIG. 8B represents restriction candidate information including the verification results of restriction candidates for the post-processing. The verification result is "Allowed" regarding the restriction candidate "Do start_monitor (MS) After stop_monitor (MS)", that is, the restriction candidate in which the operation "start_monitor (MS)" is always performed after the operation "stop_monitor (MS)", for example. As another example, the verification result is "Allowed" regarding the restriction candidate "Do start_monitor (MS) After apply_patch (s, Patch)", that is, the restriction candidate in which the operation "start_monitor (MS)" is always performed after the operation "apply_patch (s, Patch)". By contrast, the verification result is "Denied" regarding the restriction candidate "Do stop_monitor (MS) After start_monitor (MS)", that is, the restriction candidate in which the operation "stop_monitor (MS)" is always performed after the operation "start_monitor (MS)".

In this manner, the restriction candidate information for the preprocessing and the restriction candidate information for the post-processing are generated based on the operation definition 2 including the script(operation control information 21) for the operation control related to server patch application operation (regarded as operation A), for example. The following describes an example of processing of generating restriction candidate information for the preprocessing and restriction candidate information for the post-processing based on another operation definition 2 with reference to FIGS. 9 to 12.

Another Example of Processing by Analysis Target Specifying Unit

Figure 9:
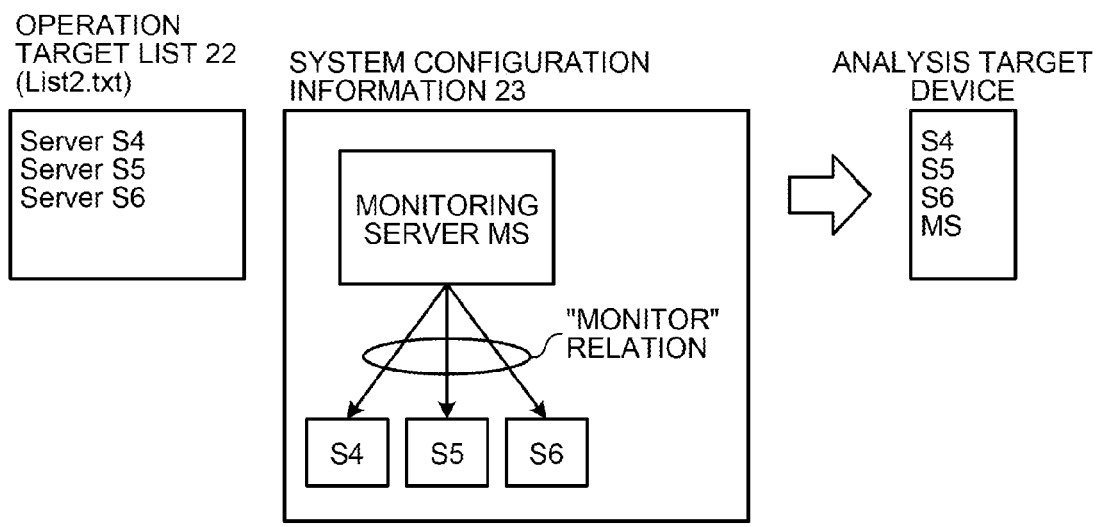
FIG. 9 is a diagram explaining another example of processing by the analysis target specifying unit.

First, another example of processing by the analysis target specifying unit 11 is described with reference to FIG. 9. FIG. 9 is a diagram explaining another example of processing by the analysis target specifying unit. As illustrated in FIG. 9, the operation target list 22 (List1.txt) of the operation definition 2 describes therein "Server S4" indicating a server S4, "Server S5" indicating a server S5, and "Server S6" indicating a server S6 as operation target devices. The system configuration information 23 of the operation definition 2 defines the relation in which the monitoring server MS monitors the servers S4, S5, and S6 (monitor) as system configuration information.

The analysis target specifying unit 11 specifies the servers S4, S5, and S6 as analysis target devices based on the operation target list 22. The analysis target specifying unit 11 also specifies the monitoring server MS that is a device related to the servers S4, S5, and S6 that are the specified operation target devices, as an analysis target device, based on the system configuration information 23. That is, the analysis target specifying unit 11 specifies the servers S4, S5, and S6, and the server MS as analysis target devices.

Another Example of Processing by Restriction Candidate Extracting Unit

Next, another example of processing by the restriction candidate extracting unit 12 is described with reference to FIG. 10. FIG. 10 is a diagram explaining another example of processing by the restriction candidate extracting unit.

As illustrated in FIG. 10, the operation control information 21 is a script for the operation control related to application installation operation. The analysis target devices are the servers S4, S5, and S6, and the monitoring server MS specified by the analysis target specifying unit 11. The preprocessing and the post-processing are the same as processing described above. That is, the preprocessing is "Do Y before X" indicating that the operation Y is always performed before the operation X, and the post-processing is "Do Y after X" indicating that the operation Y is always performed after the operation X. The X and Y in the preprocessing and post-processing are parameters representing operations performed on devices.

The restriction candidate extracting unit 12 extracts operations related to the analysis target devices from the operation control information 21. That is, the restriction candidate extracting unit 12 extracts operations that can be included in X and Y in the preprocessing and post-processing in accordance with the analysis target devices. Regarding the monitoring server MS, the restriction candidate extracting unit 12 extracts "stop_monitor" indicating the operation for stopping a monitoring function and "start_monitor" indicating the operation for restarting the monitoring function. Regarding the servers S4, S5, and S6, the restriction candidate extracting unit 12 extracts "install" indicating the installation operation, "reboot" indicating the rebooting operation, and "restore" indicating the operation for restoring the state.

Then, the restriction candidate extracting unit 12 extracts, using the preprocessing "Do Y before X" with parameterized operation parts and the operations related to the analysis target devices, restriction candidates for the preprocessing considering system configurations of the analysis target devices. Moreover, the restriction candidate extracting unit 12 extracts, using the post-processing "Do Y after X" with parameterized operation parts and the operations related to the analysis target devices, restriction candidates for the post-processing considering system configurations of the analysis target devices. The extraction result is represented in the table form illustrated in FIG. 6B although it is not illustrated here.

Figure 11:
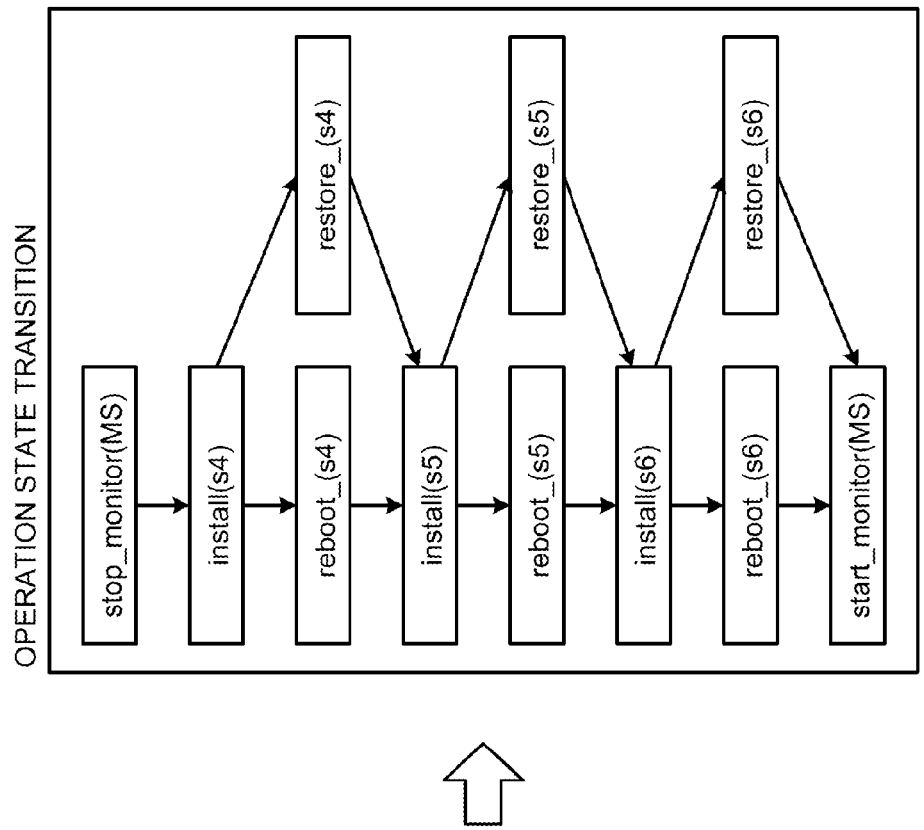
FIG. 11 is a diagram explaining another example of processing by the operation state transition model constructing unit.

Another Example of Processing by Operation State Transition Model Constructing Unit Next, another example of processing by the operation state transition model constructing unit 13 is described with reference to FIG. 11. FIG. 11 is a diagram explaining another example of processing by the operation state transition model constructing unit. As illustrated in FIG. 11, the operation state transition is constructed based on the operation control information 21. That is, the operation state transition model constructing unit 13 constructs a state transition model related to operations based on an operation string of the operation control information 21. The operation state transition constructed based on the operation control information 21 describes therein that "stop_monitor" is executed on the monitoring server MS, for example. In addition, the operation state transition describes therein that "install" is executed on the server s4 after "stop_monitor" is executed, and "reboot" is executed when the installation succeeds, or "restore" is executed when the installation fails. The operation state transition constructed by the operation state transition model constructing unit 13 is used by the restriction candidate sufficiency verifying unit 14 for restriction candidate sufficiency verification.

Another Example of Processing by Restriction Candidate Sufficiency Verifying Unit Next, another example of processing by the restriction candidate sufficiency verifying unit 14 is described with reference to FIG. 12. FIG. 12 is a diagram explaining another example of processing by the restriction candidate sufficiency verifying unit.

As illustrated in FIG. 12, the restriction candidate sufficiency verifying unit 14 performs restriction candidate sufficiency verification of restriction candidates extracted by the restriction candidate extracting unit 12 using the operation state transition constructed by the operation state transition model constructing unit 13, and detects a verification result for each restriction candidate. The verification result is represented with "Allowed" when a restriction candidate fulfills the sufficiency, and with "Denied" when a restriction candidate does not fulfill the sufficiency. Then, the restriction candidate sufficiency verifying unit 14 generates restriction candidate information including the verification result for each restriction candidate.

The upper table of FIG. 12 represents restriction candidate information including the verification results of restriction candidates for the preprocessing. The verification result is "Allowed" regarding the restriction candidate "Do stop_monitor (MS) Before start_monitor (MS)", that is, the restriction candidate in which the operation "stop_monitor (MS)" is always performed before the operation "start_monitor (MS)", for example. As another example, the verification result is "Allowed" regarding the restriction candidate "Do stop_monitor (MS) Before install (s)", that is, the restriction candidate in which the operation "stop_monitor (MS)" is always performed before the operation "install (s)". By contrast, the verification result is "Denied" regarding the restriction candidate "Do start_monitor (MS) Before stop_monitor (MS)", that is, the restriction candidate in which the operation "start_monitor (MS)" is always performed before the operation "stop_monitor (MS)".

The lower table of the FIG. 12 represents restriction candidate information including the verification results of restriction candidates for the post-processing. The verification result is "Allowed" regarding the restriction candidate "Do start_monitor (MS) After stop_monitor (MS)", that is, the restriction candidate in which the operation "start_monitor (MS)" is always performed after the operation "stop_monitor (MS)", for example. As another example, the verification result is "Allowed" regarding the restriction candidate "Do start_monitor (MS) After install (s)", that is, the restriction candidate in which the operation "start_monitor (MS)" is always performed after the operation "install (s)". By contrast, the verification result is "Denied" regarding the restriction candidate "Do stop_monitor (MS) After start_monitor (MS)", that is, the restriction candidate in which the operation "stop_monitor (MS)" is always performed after the operation "start_monitor (MS)".

In this manner, the restriction candidate information for the preprocessing and the restriction candidate information for the post-processing are generated based on the operation definition 2 including the script (operation control information 21) for the operation control related to application installation operation (regarded as operation B), for example. The following describes an example of processing of extracting restriction conditions from the restriction candidate information generated by the operation A and the restriction candidate information generated by the operation B with reference to FIGS. 13A and 13B.

Example of Processing by Restriction Condition Comparing Unit

FIGS. 13A and 13B are diagrams explaining an example of processing by the restriction condition comparing unit. The upper table of FIG. 13A represents restriction candidate information including the verification results of restriction candidates for the preprocessing regarding the operation A. The lower table of FIG. 13B represents restriction candidate information including the verification results of restriction candidates for the preprocessing regarding the operation B.

The restriction condition comparing unit 15 compares restriction candidate information regarding a plurality of operations A and B, and extracts restriction candidates existent (common) in both operations A and B as restriction conditions. The restriction candidate "Do stop_monitor (MS) Before start_monitor (MS)", that is, the restriction candidate in which the operation "stop_monitor (MS)" is always performed before the operation "start_monitor (MS)" is matched between the operations A and B. Moreover, the restriction candidate "Do stop_monitor (MS) Before reboot (s)", that is, the restriction candidate in which the operation "stop_monitor (MS)" is always performed before the operation "reboot (s)" is matched between the operations A and B.

Thus, the restriction condition comparing unit 15 extracts "Do stop_monitor (MS) before start_monitor (MS)" as a restriction condition for the preprocessing. That is, the restriction condition comparing unit 15 extracts the restriction condition related to an execution order on a single device, that is, the single monitoring server MS, here. Moreover, the restriction condition comparing unit 15 extracts "Do stop_monitor (MS) before reboot (s) (if MS monitors s)" as a restriction condition for the preprocessing. That is, the restriction condition comparing unit 15 extracts the restriction condition related to an execution order on related devices, that is, the monitoring server MS and the server s, here.

The upper table of FIG. 13B represents restriction candidate information including the verification results of restriction candidates for the post-processing regarding the operation A. The lower table of FIG. 13B represents restriction candidate information including the verification results of restriction candidates for the post-processing regarding the operation B.

The restriction condition comparing unit 15 compares restriction candidate information regarding a plurality of operations A and B, and extracts restriction candidates existent (common) in both operations A and B as restriction conditions. The restriction candidate "Do start_monitor (MS) After stop_monitor (MS)", that is, the restriction candidate in which the operation "start_monitor (MS)" is always performed after the operation "stop_monitor (MS)" is matched between the plurality of operations A and B. Moreover, the restriction candidate "Do start_monitor (MS) After reboot (s)", that is, the restriction candidate in which the operation "start_monitor (MS)" is always performed after the operation "reboot (s)" is matched between the operations A and B.

Thus, the restriction condition comparing unit 15 extracts "Do start_monitor (MS) after stop_monitor (MS)" as a restriction condition for the post-processing. That is, the restriction condition comparing unit 15 extracts the restriction condition related to an execution order on a single device, that is, the single monitoring server MS, here. Moreover, the restriction condition comparing unit 15 extracts "Do start_monitor (MS) after reboot (s) (if MS monitors s)" as a restriction condition for the post-processing. That is, the restriction condition comparing unit 15 extracts the restriction condition related to an execution order on related devices, that is, the monitoring server MS and the server s, here. Then, the restriction condition comparing unit 15 stores the extracted restriction conditions for the post-processing in the restriction condition storing unit 16.

The restriction condition extraction apparatus 1 may output restriction conditions stored in the restriction condition storing unit 16. FIG. 14 is a diagram of an output example of restriction conditions extracted in FIGS. 13A and 13B. The n and m in FIG. 14 indicate operation target devices that are system components, and the n is a different device from the m. In the output example of FIG. 14, a relation between n and m o1, an operation o2, a relation between operations o3, and an operation o4 are output in an associated manner. The relation between n and m o1 represents a relation between the components of a device subjected to the operation o2 and a device subjected to the operation o4. For example, when the device subjected to the operation o2 and the device subjected to the operation o4 are same, "-" is output indicating that there is no relation between the components, that is, a single component. When a device subjected to the operation o2 and another device subjected to the operation o4 and one of the devices monitors the other, "monitor" is output indicating that there is a monitor relation. The operation o2 and the operation o4 indicate operations forming a restriction condition. The relation between operations o3 indicates a relation between the operations of the operation o2 and the operation o4. For example, "before" is output indicating that the operation o2 is preprocessing of the operation o4, or "after" is output indicating that the operation o2 is post-processing of the operation o4.

For example, when the relation between n and m o1 is "-", "stop_monitor (n)" as the operation o2, "before" as the relation between operations o3, and "start_monitor (n)" as the operation o4 are output. That is, the restriction condition defined by these outputs is a restriction condition for the preprocessing related to a single component (n) "Do stop_monitor (MS) before start_monitor (MS)". Alternatively, when the relation between n and m o1 is "-", "start_monitor (n)" as the operation o2, "after" as the relation between operations o3, and "stop_monitor (n)" as the operation o4 are output. That is, the restriction condition defined by these outputs is a restriction condition for the post-processing related to a single component (n) "Do start_monitor (n) after stop_monitor (n)". Alternatively, when the relation between n and m o1 is "monitor", "stop_monitor (n)" as the operation o2, "before" as the relation between operations o3, and "reboot (m)" as the operation o4 are output. That is, the restriction condition defined by these outputs is a restriction condition for the preprocessing related to the components n and m in a monitor relation "Do stop_monitor (n) before reboot (m)". Alternatively, when the relation between n and m o1 is "monitor", "start_monitor (n)" as the operation o2, "after" as the relation between operations o3, and "reboot (m)" as the operation o4 are output. That is, the restriction condition defined by these outputs is a restriction condition for the post-processing related to the components n and m in a monitor relation "Do start_monitor (n) After reboot (m)".

Procedure of Restriction Condition Extraction Processing

Figure 15:
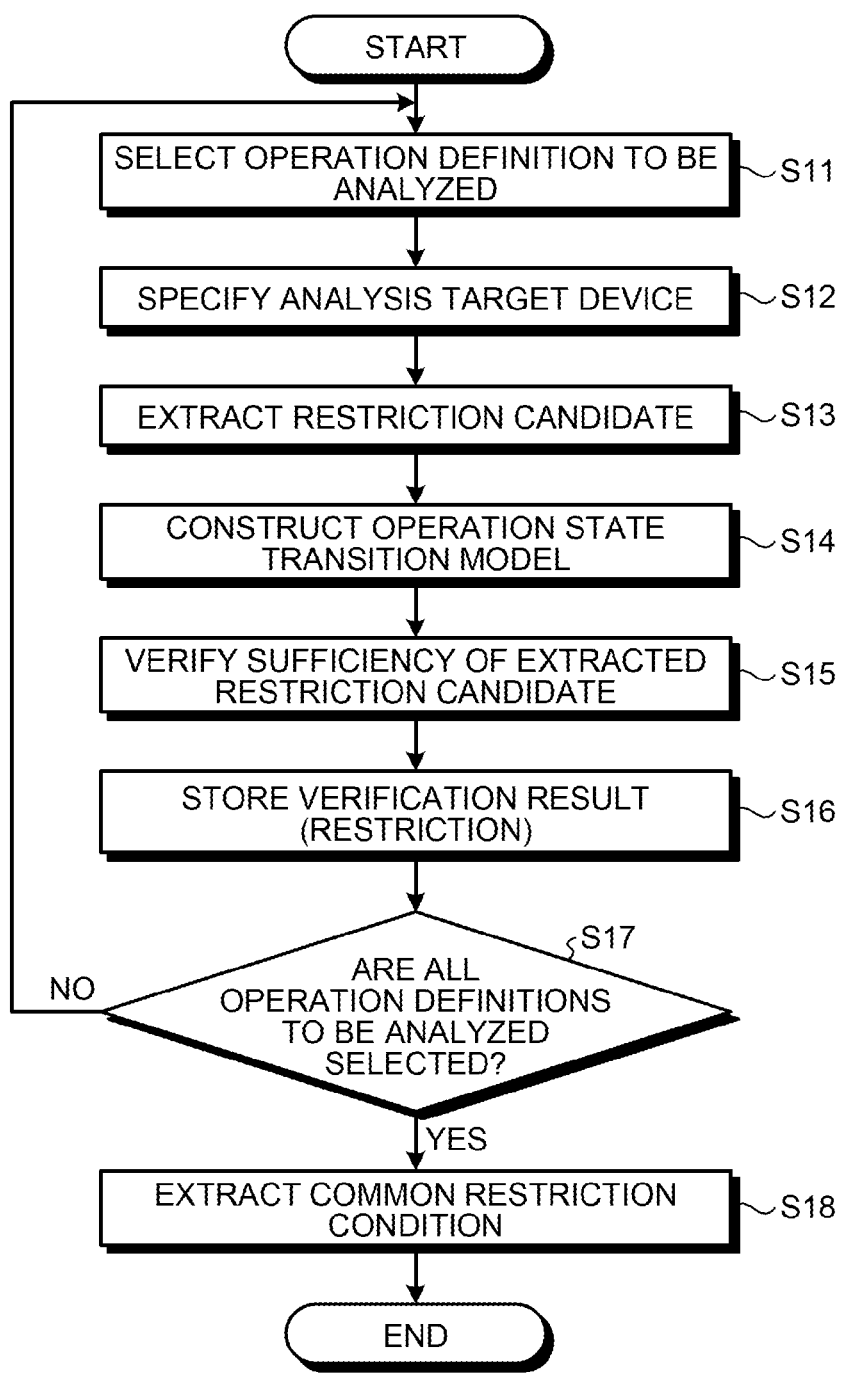
FIG. 15 is a flowchart of restriction condition extraction processing of the embodiment.

Next, the procedure of restriction condition extraction processing is described with reference to FIG. 15. FIG. 15 is a flowchart of restriction condition extraction processing of the embodiment. It is assumed that an input device (not illustrated) has ordered the restriction condition extraction apparatus 1 to start restriction condition extraction processing, for example.

The restriction condition extraction apparatus 1 ordered to start restriction condition extraction processing selects the operation definition 2 to be analyzed (Step S11). Then, the analysis target specifying unit 11 specifies analysis target devices based on the selected operation definition 2 (Step S12). For example, the analysis target specifying unit 11 specifies analysis target devices using the operation target list 22 and the system configuration information 23 included in the selected operation definition 2 (Step S12).

Subsequently, the restriction candidate extracting unit 12 extracts restriction candidates using the specified analysis target devices and the operation control information 21 included in the selected operation definition 2 (Step S13). For example, the restriction candidate extracting unit 12 extracts operations related to the analysis target devices specified by the analysis target specifying unit 11 from the operation control information 21. Then, the restriction candidate extracting unit 12 extracts, using the preprocessing with parameterized operation parts and the operations related to the analysis target devices, restriction candidates for the preprocessing considering system configurations of the analysis target devices. Moreover, the restriction candidate extracting unit 12 extracts, using the post-processing with parameterized operation parts and the operations related to the analysis target devices, restriction candidates for the post-processing considering system configurations of the analysis target devices. The preprocessing indicates processing related to an operation execution order in which the operation Y is always performed before the operation X, and the post-processing indicates processing related to an operation execution order in which the operation Y is always performed after the operation X. The X and Y are parameters indicating operations performed on devices.

Next, the operation state transition model constructing unit 13 constructs an operation state transition model based on the operation control information 21 (Step S14).

Then, the restriction candidate sufficiency verifying unit 14 verifies the sufficiency of each restriction candidate extracted by the restriction candidate extracting unit 12 using the constructed operation state transition model (Step S15). The restriction candidate sufficiency verifying unit 14 temporarily stores the verification result for each extracted restriction candidate (Step S16). For example, the restriction candidate sufficiency verifying unit 14 generates restriction candidate information for the preprocessing including the verification result for each restriction candidate. Moreover, the restriction candidate sufficiency verifying unit 14 generates restriction candidate information for the post-processing including the verification result for each restriction candidate. Then, the restriction candidate sufficiency verifying unit 14 stores therein the generated restriction candidate information for the preprocessing and the generated restriction candidate information for the post-processing.

Subsequently, the restriction condition extraction apparatus 1 determines whether the operation definitions 2 to be analyzed are all selected (Step S17). When the restriction condition extraction apparatus 1 determines that the operation definitions 2 to be analyzed are not all selected (No at Step S17), it shifts the procedure to Step S11 to select the operation definition 2 that has not been selected.

By contrast, when the restriction condition extraction apparatus 1 determines that the operation definitions 2 to be analyzed are all selected (Yes at Step S17), the restriction condition comparing unit 15 compares restriction candidate information generated based on a plurality of operation definitions 2, and extracts common restriction candidates as restriction conditions (Step S18). For example, the restriction condition comparing unit 15 compares restriction candidate information for the preprocessing between a plurality of operation definitions 2, and extracts common restriction candidates as restriction conditions. Moreover, the restriction condition comparing unit 15 compares restriction candidate information for the post-processing between a plurality of operation definitions 2, and extracts common restriction candidates as restriction conditions. Thus, the restriction condition extraction processing is ended. Thereafter, the restriction condition comparing unit 15 stores the extracted restriction conditions for the preprocessing and the extracted restriction conditions for the post-processing in the restriction condition storing unit 16.

In this manner, the restriction condition extraction apparatus 1 can accurately extract common restriction conditions being fulfilled in a plurality of operation definitions 2 among the past various operation definitions 2. That is, the restriction condition extraction apparatus 1 focuses on the relation between components of the system, and extracts restriction conditions for the preprocessing (post-processing), regarding the components having a certain relation established, which are common in a plurality of operation definitions 2. Thus, the restriction condition extraction apparatus 1 can accurately extract restriction conditions fulfilled commonly in the operation definitions 2 defining different operations on different components.

In the above embodiment, the restriction condition comparing unit 15 compares a plurality of pieces of restriction candidate information, and extracts restriction candidates, regarding related devices or a single device, which are common in the plurality of pieces of restriction candidate information. In the embodiment, what is common is described as what is matched, for example. However, what is common is not limited to what is matched, and may be a fact that a match rate is higher than a threshold. Then, as a modification of processing by the restriction condition comparing unit 15, the following describes a case in which the restriction condition comparing unit 15 extracts, as restriction conditions, restriction candidates that are common in a plurality of pieces of restriction candidate information and whose match rate is higher than a threshold regarding related devices or a single device.

Figure 16:
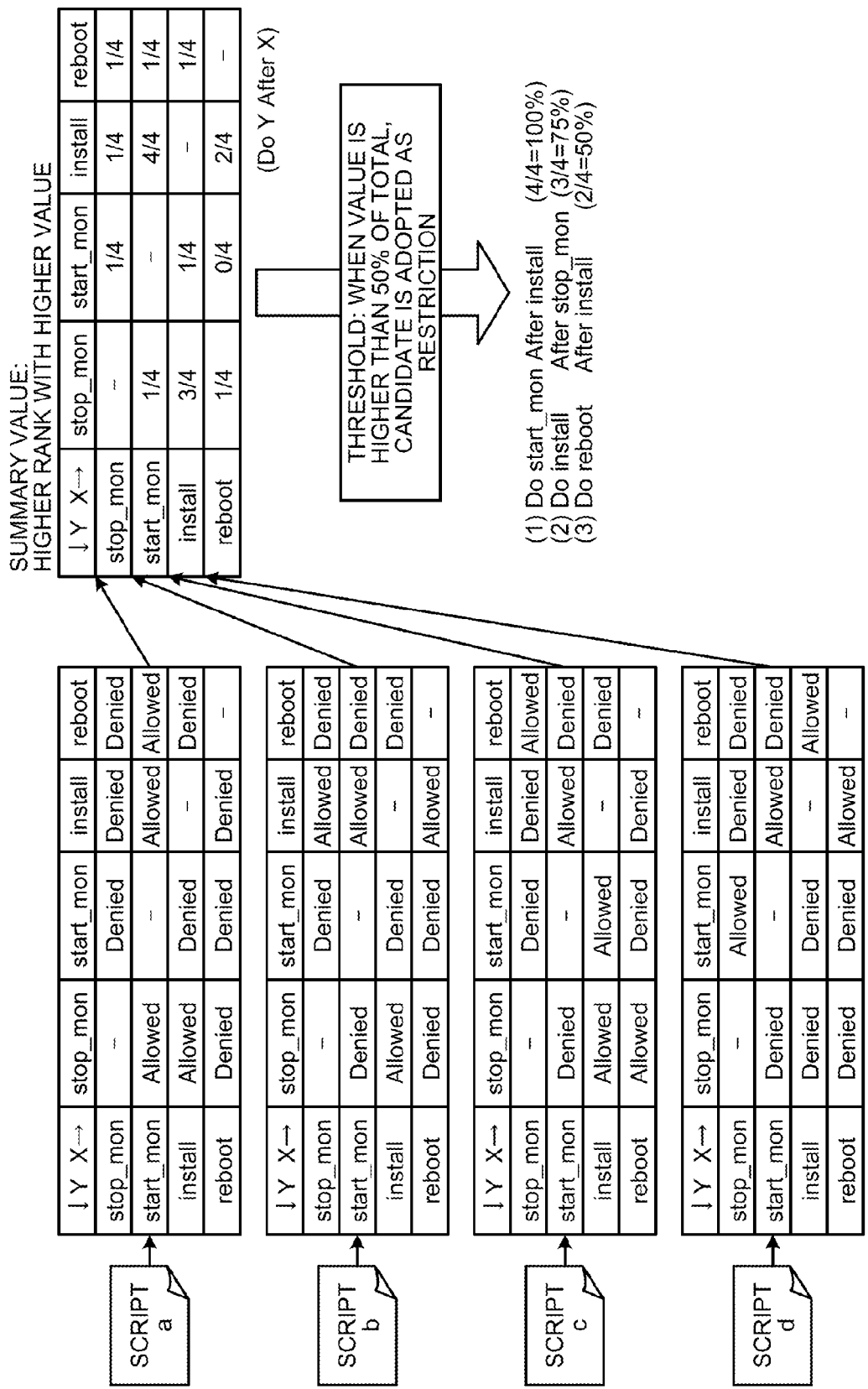
FIG. 16 is a diagram explaining a modification of processing by the restriction condition comparing unit.

FIG. 16 is a diagram explaining a modification of processing by the restriction condition comparing unit. The left tables of FIG. 16 describe therein restriction candidate information including the verification results of restriction candidates regarding a plurality of scripts a to d (operation control information 21). The scripts are examples of the operation control information 2. It is assumed that such restriction candidate information is information for the post-processing. For the convenience of description, it is assumed that the operations corresponding to X and Y in the restriction candidate information regarding the scripts a to d, which are extracted by the restriction candidate extracting unit 12, are all same, respectively. The description of devices performing each operation is omitted.

The restriction condition comparing unit 15 compares restriction candidate information regarding a plurality of scripts a to d, and calculates a match rate for each restriction candidate. The match rate is 4/4 regarding the restriction candidate "Do start_mon After install", that is, the restriction candidate in which the operation "start_mon" is always performed after the operation "install". Moreover, the match rate is 3/4 regarding the restriction candidate "Do install After stop_mon", that is, the restriction candidate in which the operation "install" is always performed after the operation "stop_mon". Furthermore, the match rate is 2/4 regarding the restriction candidate "Do reboot After install", that is, the restriction candidate in which the operation "reboot" is always performed after the operation "install".

Then, the restriction condition comparing unit 15 extracts restriction candidates whose match rate is higher than a threshold as restriction conditions. The threshold is set to be 50%, for example. Then, the restriction condition comparing unit 15 extracts "Do start_mon After install" whose match rate is 100%, "Do install After stop_mon" whose match rate is 75%, and "Do reboot After install" whose match rate is 50% as restriction conditions.

In this manner, with use of a restriction candidate match rate in restriction condition extraction, the restriction condition comparing unit 15 can extract various restriction conditions in accordance with the reliability of restriction conditions.

Effects of Embodiment

In the above embodiment, the restriction condition extraction apparatus 1 specifies analysis target devices including operation target devices and devices related to the operation target devices that are operated based on the operation control information 21, in a system execution environment. Then, the restriction condition extraction apparatus 1 extracts the operations related to the specified analysis target devices from the operation control information 21. Subsequently, the restriction condition extraction apparatus 1 generates relation information (restriction candidate information) indicating the relation of an execution order on related devices, with respect to the extracted operations. Then, the restriction condition extraction apparatus 1 compares a plurality of pieces of restriction candidate information, and extracts the relation of an execution order on related devices (restriction candidates), which are common in the plurality of pieces of restriction candidate information, as restriction conditions. In this configuration, the restriction condition extraction apparatus 1 focuses on the relation between components of the system, and extracts restriction candidates, regarding related components, which are common in a plurality of pieces of operation control information 21, as restriction conditions. In this manner, the restriction condition extraction apparatus 1 can extract accurately restriction conditions fulfilled commonly in the respective pieces of the operation control information 21 defining different operations on components in different execution environment systems.

In the above embodiment, the restriction condition extraction apparatus 1 compares a plurality of pieces of relation information (restriction candidate information), and extracts the relation of an execution order on related devices (restriction candidates), which are common with a rate higher than a given rate in the plurality of pieces of restriction candidate information. In such a configuration, with use of a restriction candidate match rate in restriction condition extraction, the restriction condition extraction apparatus 1 can extract various restriction conditions in accordance with the reliability of restriction conditions.

Others

The restriction condition extraction apparatus 1 can be achieved by adding functions of the analysis target specifying unit 11, the restriction candidate extracting unit 12, etc., that are described above to a known information processing apparatus such as a personal computer and a work station.

In the above embodiment, the control information (script) for server patch application operation and the control information (script) for application installation operation are adopted as operation control information of a plurality of operation definitions 2 to be compared. However, the operation control information of a plurality of operation definitions 2 to be compared is not limited thereto, and may be any control information for a given operation related to the operation management.

Moreover, in the embodiment, the same configuration is adopted as system configuration information 23 of a plurality of operation definitions 2 to be compared. However, the system configuration information 23 of a plurality of operation definitions 2 to be compared is not limited to be same, and may be different.

The illustrated components of the apparatus are not necessarily configured physically as illustrated in the drawings. That is, the concrete form of distribution and integration of the apparatus is not limited to the form illustrated in the drawings, and the entire of the apparatus or one part thereof may be distributed or integrated functionally or physically in an arbitrary unit, depending on various loads, a use state, etc. For example, the analysis target specifying unit 11 and the restriction candidate extracting unit 12 may be integrated as one unit. By contrast, the restriction condition comparing unit 15 may be distributed to a comparing unit that compares a plurality of pieces of restriction candidate information, an extracting unit that extracts restriction conditions based on the comparison results, and a storing unit that stores the extracted restriction conditions in the restriction condition storing unit 16. Moreover, the restriction condition storing unit 16 may be stored in an external device of the restriction condition extraction apparatus 1, or an external device storing the restriction condition storing unit 16 may be connected to the restriction condition extraction apparatus 1 through a network.

Figure 17:
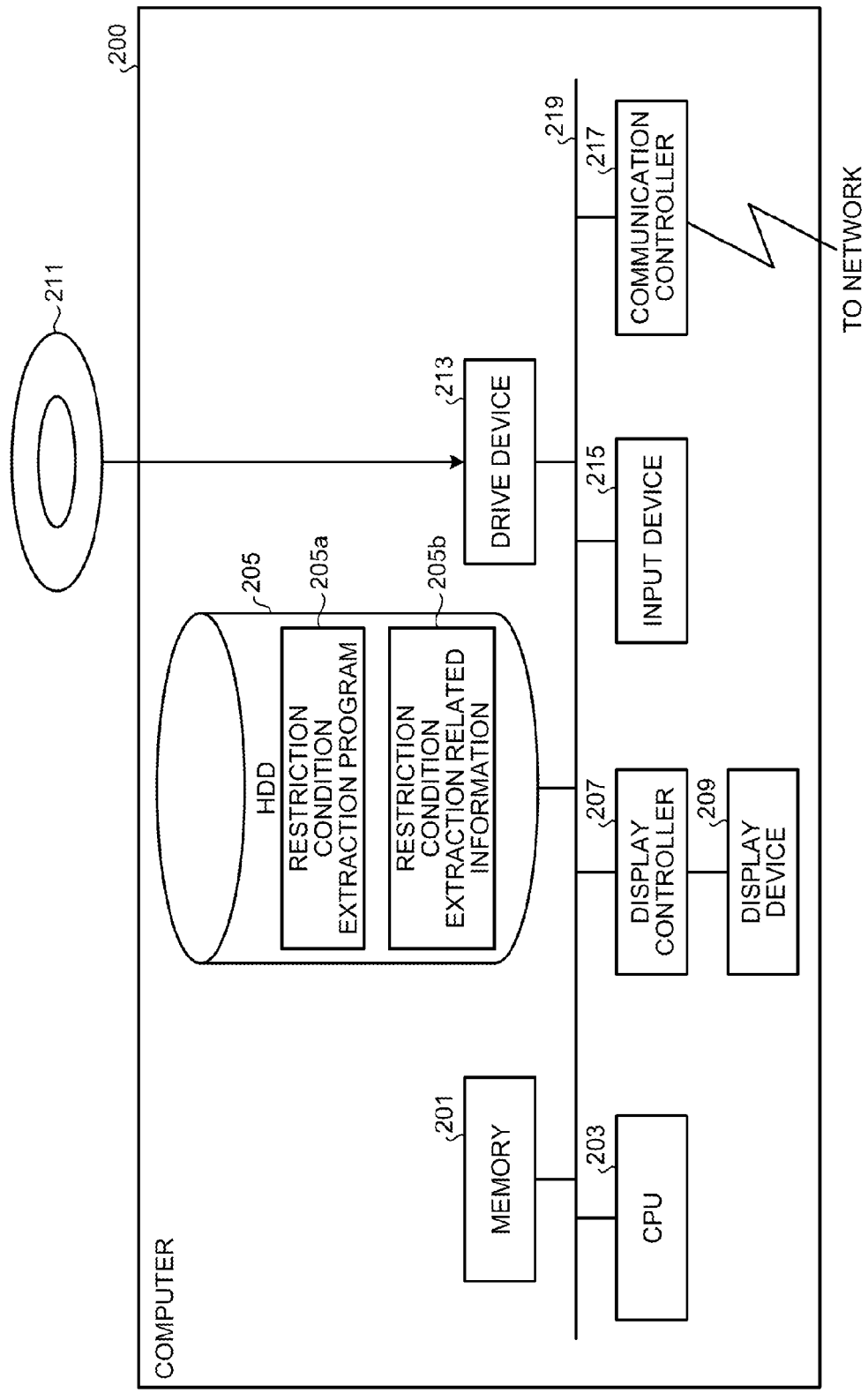
FIG. 17 is an example diagram of a computer executing a restriction condition extraction program.

The various kinds of processing described in the above embodiment can be achieved by executing a preliminarily prepared program on a computer such as a personal computer and a work station. Then, the following describes an example of a computer that executes a restriction condition extraction program achieving the functions same as of the restriction condition extraction apparatus 1 illustrated in FIG. 1. FIG. 17 is an example diagram of a computer executing the restriction condition extraction program.

As illustrated in FIG. 17, a computer 200 includes a central processing unit (CPU) 203 that executes various kinds of arithmetic processing, an input device 215 that receives data input by a user, and a display controller 207 that controls a display device 209. The computer 200 also includes a drive device 213 that reads out a program, etc., from a storage medium, and a communication controller 217 that transmits and receives data to and from another computer through a network. Moreover, the computer 200 includes a memory 201 and a hard disk drive (HDD) 205 that temporarily store various kinds of information. The memory 201, the CPU 203, the HDD 205, the display controller 207, the drive device 213, the input device 215, and the communication controller 217 are connected through a bus 219.

The drive device 213 is a device for a removable disk 211, for example. The HDD 205 stores a restriction condition extraction program 205a and restriction condition extraction related information 205b.

The CPU 203 reads out the restriction condition extraction program 205a, loads it on the memory 201, and executes it as a process. The process corresponds to each function unit of the restriction condition extraction apparatus 1. The restriction condition extraction related information 205b corresponds to the restriction condition storing unit 16. Then, the removable disk 211 stores information of the operation definitions 2, for example.

The restriction condition extraction program 205a is not necessarily stored in the HDD 205 from the beginning. For example, the program is stored in a "portable physical medium" inserted to the computer 200, such as a flexible disk (FD), a compact disk read-only memory (CD-ROM), a digital versatile disk (DVD), a magneto-optical disk, and an integrated circuit (IC) card. Then, the computer 200 may read out the restriction condition extraction program 205a from the portable physical medium, and execute it.

With one aspect of the restriction condition extraction program described in this application, it is possible to accurately construct restriction conditions used for script verification and improve the reliability of scripts.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a restriction condition extraction process comprising:
   first specifying operation targets including a first target and another target device related to the first target device from first procedure information containing a plurality of procedures, the operation target devices operating based on the first procedure information, in a first execution environment;
   first extracting first procedures operated by the operation target devices specified at the first specifying from the first procedure information;
   first generating first relation information indicating relations of an execution order regarding the extracted first procedures on the operation target devices;
   second specifying operation targets including a second target device and another target device related to the second target device from second procedure information containing a plurality of procedures, the operation target devices operating based on the second procedure information, in a second execution environment that is different from the first execution environment;
   second extracting second procedures operated the operation target devices specified at the second specifying from the second procedure information;
   second generating second relation information indicating relations of an execution order regarding the extracted second procedures on the operation target devices; and
   extracting common relations of an execution order on related operation target devices regarding the procedures in the first relation information and the second relation information, the relations being common with a rate exceeding a given rate in a plurality of pieces of relation information, based on comparison between the first relation information and the second relation information.

2. The non-transitory computer-readable recording medium according to claim 1, wherein the extracting common relations includes extracting common relations of the execution order on related operation targets devices, the relations being common with a rate exceeding a given rate in a plurality of pieces of relation information, based on comparison between the pieces of relation information.

3. A restriction condition extraction apparatus, comprising:
   a processor; and
   a memory, wherein the processor executes:
   first specifying operation target devices including a first target device and another target device related to the first target device from first procedure information containing a plurality of procedures, the operation target devices operating based on the first procedure information in a first execution environment;
   extracting first procedures operated by the operation target devices specified at the first specifying from the first procedure information;
   first generating first relation information indicating relations of an execution order regarding the extracted first procedures on the operation target devices;
   second specifying operation target devices including a second target device and another target device related to the second target device from second procedure information containing a plurality of procedures, the operation targets being operated based on the second procedure information, in a second execution environment that is different from the first execution environment;
   second extracting second procedures operated by the operation target devices specified at the second specifying from the second procedure information;
   second generating second relation information indicating relations of an execution order on related the extracted second procedures on the operation target devices; and
   extracting common relations of an execution order on related operation target devices regarding the procedures in the first relation information and the second relation information, the relations being common with a rate exceeding a given rate in a plurality of pieces of relation information, based on comparison between the first relation information and the second relation information.

4. A method for extracting restriction condition executed on a computer, the method comprising:
   first specifying operation target devices including a first target and another target device related to the first target device from first procedure information containing a plurality of procedures, the operation target devices operating based on the first procedure information, in a first execution environment using a processor;

first extracting first procedures operation target devices specified at the first specifying from the first procedure information using the processor;

first generating first relation information indicating relations of an execution order regarding the extracted first procedures on the operation target devices using the processor;

second specifying operation target devices including a second target device and another target device related to the second target device from second procedure information containing a plurality of procedures, the operation target devices operating based on the second procedure information, in a second execution environment that is different from the first execution environment using the processor;

second extracting second procedures operated by the operation target device specified at the second specifying from the second procedure information using the processor;

second generating second relation information indicating relations of an execution order on regarding the extracted second procedures on the operation target devices using the processor; and extracting common relations of the execution order on related operation target devices regarding the procedures in the first relation information and the second relation information, the relations being common with a rate exceeding a given rate in a plurality of pieces of relation information, based on comparison between the first relation information and the second relation information using the processor.

* * * * *